(12) United States Patent
Denis et al.

(10) Patent No.: US 9,763,034 B2
(45) Date of Patent: *Sep. 12, 2017

(54) CHANNEL-TYPE SUPERVISED NODE POSITIONING METHOD FOR A WIRELESS NETWORK

(71) Applicant: COMMISSARIAT A L'ENERGIE ATOMIQUE ET AUX ENE ALT, Paris (FR)

(72) Inventors: Benoit Denis, Grenoble (FR); Laurent Ouvry, Grenoble (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/349,903

(22) PCT Filed: Oct. 16, 2012

(86) PCT No.: PCT/EP2012/070490
§ 371 (c)(1),
(2) Date: Apr. 4, 2014

(87) PCT Pub. No.: WO2013/057104
PCT Pub. Date: Apr. 25, 2013

(65) Prior Publication Data
US 2014/0256353 A1     Sep. 11, 2014

(30) Foreign Application Priority Data

Oct. 17, 2011 (EP) .................................. 11290480

(51) Int. Cl.
*H04W 4/02* (2009.01)
*G01S 5/02* (2010.01)
(Continued)

(52) U.S. Cl.
CPC .............. *H04W 4/02* (2013.01); *G01S 5/0278* (2013.01); *G01S 5/0289* (2013.01); *H04W 64/003* (2013.01); *H04W 84/18* (2013.01)

(58) Field of Classification Search
CPC ..... H04W 4/005; H04W 84/18; H04W 24/00; H04W 4/02; H04W 64/00; H04W 64/003;
(Continued)

(56) References Cited

U.S. PATENT DOCUMENTS 5,884,215 A    3/1999   Birchler et al.
8,126,405 B2   2/2012   Duan et al.
(Continued)

FOREIGN PATENT DOCUMENTS

JP    2008-537653 A    9/2008
JP    2009-47487 A     3/2009
(Continued)

OTHER PUBLICATIONS

Dragos Niculescu, et al., "Ad Hoc Positioning System (APS)", published in Proc. of Global Telecommunications Conference, 2001, GLOBECOM'01, San Antonio Texas, USA, XP-10747393, pp. 2926-2931.
(Continued)

*Primary Examiner* — Vladimir Magloire
*Assistant Examiner* — Ernest Tacsik
(74) *Attorney, Agent, or Firm* — Oblon, McClelland, Maier & Neustadt, L.L.P.

(57) ABSTRACT

A method for positioning a collection of nodes within a wireless sensor network in which each node measures Respective Strength of Signals (RSSs), from its neighboring nodes, and channels linking regular nodes and its neighboring nodes are classified into different categories and are allocated path loss parameters accordingly. Distances separating each regular node from each of its neighboring nodes,
(Continued)

and respective variances thereof, are estimated on the basis of the measured RSSs and the allocated path loss parameters. The positions of the regular nodes are then estimated by Weighted Least Square, optimization where the distances to be matched and the variances used for the weighting are those previously estimated.

11 Claims, 6 Drawing Sheets

(51) Int. Cl.
  *H04W 64/00* (2009.01)
  *H04W 84/18* (2009.01)

(58) Field of Classification Search
  CPC .... H04W 40/02; H04L 12/28; H04L 12/5695; H04L 41/12; H04L 45/02
  USPC ........................................ 455/456.1; 370/255
  See application file for complete search history.

(56) References Cited

U.S. PATENT DOCUMENTS

| | | | |
|---|---|---|---|
| 8,738,337 B2 | 5/2014 | Hunt et al. | |
| 2002/0086707 A1* | 7/2002 | Struhsaker | H01Q 1/246 455/561 |
| 2004/0192330 A1* | 9/2004 | Gaal | G01S 5/02 455/456.1 |
| 2005/0003827 A1* | 1/2005 | Whelan | H04W 16/10 455/454 |
| 2005/0285793 A1* | 12/2005 | Sugar | G01S 5/0252 342/465 |
| 2006/0039286 A1* | 2/2006 | Basu | H04L 45/02 370/238 |
| 2006/0239202 A1* | 10/2006 | Kyperountas | G01S 5/0289 370/252 |
| 2008/0002771 A1* | 1/2008 | Chen | H04N 19/139 375/240.16 |
| 2008/0032708 A1* | 2/2008 | Guvenc | G01S 5/0215 455/456.2 |
| 2009/0046013 A1 | 2/2009 | Yanagihara et al. | |
| 2010/0109938 A1* | 5/2010 | Oswald | G01S 7/2926 342/90 |
| 2010/0248637 A1* | 9/2010 | Sahinoglu | G01S 5/0289 455/67.11 |
| 2011/0074569 A1 | 3/2011 | Alsindi et al. | |
| 2016/0261307 A1 | 9/2016 | Hameau et al. | |

FOREIGN PATENT DOCUMENTS

| | | |
|---|---|---|
| JP | 2010-187359 A | 8/2010 |
| WO | 98/34124 | 8/1998 |
| WO | 2008/017034 | 2/2008 |
| WO | WO 2010/113829 A1 | 10/2010 |
| WO | 2011/040346 | 4/2011 |
| WO | WO 2011/077166 A1 | 6/2011 |

OTHER PUBLICATIONS

M. Laaraiedh, et al., "Enhancing positioning accuracy through direct position estimators based on hybrid RSS data fusion", published in Proc. IEEE VTC'09, Spring Barcelona, Spain, 2009, 5 pages.
S. Al-Jazzar, et al., "New Algorithms for NLOS Identification", Published in IST Mobile and Wireless Comm. Summit, Dresden, 2005, pp. 1-5.
Kegen Yu, et al., "Statistical NLOS Identification Based on AOA,TOA, and Signal Strength", IEEE Transactions on Vehicular Technology, vol. 58, No. 1, Jan. 2009, pp. 274-286.
International Search Report issued Dec. 21, 2012, in PCT/EP12/070490, filed Oct. 16, 2012.
Written Opinion of the International Searching Authority issued Dec. 21, 2012, in PCT/EP12/070490, filed Oct. 16, 2012.
European Search Report issued Apr. 13, 2012 in EP 11 29 0480 Filed Oct. 17, 2011.
Caffery, J. et al., "Overview of Radiolocation in CDMA Cellular Systems", IEEE Communications Magazine, vol. 36, No. 4, pp. 38-45 , XP 000752569,1998.
U.S. Appl. No. 14/352,535, filed Apr. 17, 2014, Denis, et al.
U.S. Appl. No. 14/351,971, filed Apr. 15, 2014, Denis, et al.
U.S. Appl. No. 14/435,370, filed Apr. 13, 2015, Dehmas, et al.
U.S. Appl. No. 14/435,283, filed Apr. 13, 2015, Dehmas, et al.
U.S. Appl. No. 14/435,338, filed Apr. 13, 2015, Ouvry, et al.
U.S. Appl. No. 14/739,072, filed Jun. 15, 2015, Dehmas, et al.
U.S. Appl. No. 15/230,939, filed Aug. 8, 2016, Iulia Tunaru, et al.
Office Action issued on Sep. 20, 2016 in Japanese Patent Application No. 2014-535122 (with English translation).
Andrea Goldsmith, "Wireless Communications", Stanford University, 2004, pp. 1-419 and Cover Pages (with partial Japanese translation).

* cited by examiner

CHANNEL-TYPE SUPERVISED NODE POSITIONING METHOD FOR A WIRELESS NETWORK

TECHNICAL FIELD

The present application pertains to the field of wireless networks, more particularly to Wireless Sensor Networks (WSNs). It relates to a method for positioning nodes in such networks.

PRIOR ART

Wireless Sensor Networks (WSNs) can be applied to various areas such as military affairs, commerce, medical care, environment monitoring and have been a subject of intensive research over the last few years. In a wireless sensor network (WSN), data collected by the nodes (sensors) are typically collected and processed by one or more controlling nodes. In many applications (e.g. environment monitoring), processing of the data cannot be performed without knowing the respective positions of the nodes these data are collected from.

Many positioning algorithms have been proposed in the prior art to determine the location of nodes in a WSN. These algorithms generally assume that the position of certain nodes, also called anchor nodes or landmarks, have an a priori knowledge of their coordinates, e.g. by GPS positioning. The (absolute) positions of the other nodes, also called regular nodes, are then inferred from the positions of the anchor nodes.

Basically, positioning algorithms for WSNs fall into two categories: range-free and range-based.

Range-free positioning algorithms approximate the distances of the regular nodes to the anchor nodes on the basis of connectivity information. Representatives of range-free positioning algorithms are DV-Hop, amorphous, and centroid algorithms. For example a description of the DV-Hop algorithm can be found in the article of D. Niculescu et al. entitled "Ad Hoc positioning system" published in Proc. of Global Telecommunications Conference, 2001, GLOBE-COM'01, San Antonio, Tex., USA, pp. 2926-2931. Basically, in DV-Hop each regular node determines its shortest path (in terms of number of hops) to a sufficient number of anchors. Similarly, each anchor node broadcasts its position and determines its shortest path (again, in terms of number of hops) to the remaining anchor nodes. Once an anchor node has determined its shortest paths to all the other anchor nodes, it calculates the average hop size as the ratio of distances and number of hops to all the other anchor nodes. Each regular node can then simply obtain a rough estimate of a distance to an anchor node by multiplying the number of hops to this node with the average hop size. Once the distances to three anchor nodes have been estimated, a coarse position of the node can be obtained by conventional trilateration.

Range-based positioning algorithms obtain point-to-point distance information between neighboring nodes and derive therefrom the location of the regular nodes. A range-based positioning algorithm, known as the WLS algorithm, is described in the article of M. Laaraiedh et al. entitled "Enhancing positioning accuracy through direct position estimators based on hybrid RSS data fusion" published in Proc. IEEE VTC'09, Spring Barcelona, Spain. According to this algorithm, the ranges between regular nodes and anchor nodes are estimated from received signal strength (RSS) observables. Once a regular node has measured a minimum number of observables, it may estimate the ranges to a plurality of anchor nodes. The coordinates of the regular node are determined as a weighted least square (WLS) solution of an over-determined set of equations, the weighting being determined by the covariance matrix of the range estimator considered, as further explained hereinafter.

FIG. 1 schematically illustrates a known wireless sensor network to which the node positioning method according to the invention can be applied.

The illustrated wireless sensor network comprises N nodes spatially distributed in a bi-dimensional area, including:

$N_a$ anchor nodes, 110, with known locations, one of them playing the role of a network coordinator (NC), sometimes also referred to as network controller, the other anchors being either fixed routers or simple end-devices with augmented capabilities (e.g. GPS-enabled nodes), and $N_r$ regular nodes, 120, to be positioned.

The lines 130 represent radio-links between neighboring nodes. Assuming that each node is capable of measuring the strengths of the signals transmitted by other nodes, the one-hop neighborhood of a node i is the set of nodes defined as:

$$H(i)=\{j | P_{Rx,ij} > P_{th}\} \quad (1)$$

where $P_{Rx,ij}$ denotes the strength of the signal received by node i from node j and $P_{th}$ is the detection threshold of the receiver (supposed here to be identical for all the nodes). The nodes are indexed by i=1, ..., N, where without loss of generality, the $N_a$ anchor nodes are assumed to bear the first indices i=1, ..., $N_a$ and the regular nodes to bear the last indices i=$N_a$+1, ..., N (N=$N_a$+$N_r$).

Next, the WLS node positioning algorithm will be briefly described.

It is recalled that the path loss over a radio link between two neighboring nodes i and j can be modeled as follows:

$$PL(d)=PL_0+10\alpha \log_{10}(d/d_0) \quad (2)$$

where $PL_0=20 \log_{10}(4\pi f_c d_0/c)$ is the path loss experienced by the radio signal at a reference distance $d_0$, d is the distance between the two nodes, $f_c$ is the carrier frequency of the radio signal, c is the speed of light, and $\alpha$ is the path loss decay exponent.

The path loss decay exponent basically depends upon the type of environment. For example $\alpha=2$ for a line of sight (LOS) configuration in free space but has a higher value in obstructed environments.

Expression (2) is based on a simple exponential decay model of the power received through a radio link. The strength of the received signal actually varies according to a zero-mean Gaussian variable accounting for shadowing. Shadowing is a fluctuation of the attenuation due to the presence of obstacles between the transmitter and the receiver. More specifically, shadowing encompasses absorption, reflection, scattering and diffraction by these obstacles.

The strength of the signal received by a node from a neighboring one can be expressed as:

$$P_{Rx}(d)=P_{Tx}+G_{Tx}+G_{Rx}-PL(d)+z \quad (3)$$

where z is the above-mentioned Gaussian variable having a variance $\sigma_z^2$. The variance $\sigma_z^2$, also called the shadowing coefficient, depends on the type of environment in which the network is located. $P_{Rx}(d)$ is the strength of the received signal at the distance d, $P_{Tx}$ is the power of transmitted signal (expressed e.g. in dBm), $G_{Tx}$ and $G_{Rx}$ are respectively the antenna gains of the transmitter and the receiver (expressed in dBi).

Expression (3) can equivalently be reformulated as:

$$P_{Rx}(d) = \overline{P_{Rx}(d)} + z \quad (4)$$

where $\overline{P_{Rx}(d)}$ is the mean value of the received signal strength.

For a given received signal strength $P_{Rx,ij}$ measured by the receiver of node i, the distance $d_{ij}$ between the nodes i and j can be estimated from (3), e.g. by the median estimator:

$$\tilde{d}_{ij} = \exp(M_{ij}) \quad (5)$$

with $$M_{ij} = \frac{([P_{Tx} + G_{Rx} + G_{Tx} - P_{Rx,ij}] - PL_0)\log(10)}{10\alpha_{ij}} + \log(d_0)$$

and where the distance estimate $\tilde{d}$ and the path loss decay coefficient $\alpha$ have been indexed here by i,j in order to emphasize their dependence upon the link considered.

In a centralized algorithmic embodiment, once all the distances between neighboring nodes have been estimated, the coordinates of the regular nodes may be obtained through WLS optimization. More specifically, if we denote $X = (x_{N_a+1}, \ldots x_N)$ and $Y = (y_{N_a+1}, \ldots, y_N)$ respectively the abscissas and the ordinates of the regular nodes, the coordinates of these nodes can be estimated by minimizing the quadratic cost function:

$$(\hat{X}^{WLS}, \hat{Y}^{WLS}) = \underset{(\tilde{x},\tilde{y})}{\operatorname{argmin}} \left[ \sum_{i=N_a+1}^{N} \sum_{\substack{j \in H(i) \\ j>i}} \frac{1}{\sigma_{d,ij}^2} (\hat{d}_{ij} - \tilde{d}_{ij})^2 \right] \quad (6)$$

where $\hat{d}_{ij} = \sqrt{(\hat{x}_i - \hat{x}_j)^2 + (\hat{y}_i - \hat{y}_j)^2}$ and $\sigma_{d,ij}^2$ is the variance of the estimator of distance $d_{ij}$. Equivalently, the WLS optimization can be carried out as follows:

$$(\hat{X}^{WLS}, \hat{Y}^{WLS}) = \underset{(\tilde{x},\tilde{y})}{\operatorname{argmin}} \left[ \sum_{i=1}^{N} \sum_{j=1}^{N} \frac{I_{ij}}{\sigma_{d,ij}^2} (\hat{d}_{ij} - \tilde{d}_{ij})^2 \right] \quad (7)$$

where $I_{ij}$ are the elements of the network adjacency matrix defined as $I_{ij}=1$ if $j \in H(i)$, and $I_{ij}=0$ otherwise. It will be understood that the weighting performed in the WLS algorithm refers to variance terms $\sigma_{d,ij}^2$ in expressions (6) and (7): the largest the variance and, hence, the uncertainty of the distance estimate, the lower the weight of the corresponding quadratic error $(\hat{d}_{ij} - \tilde{d}_{ij})^2$ in the cost function.

Assuming that the receiver of each node is ideal $P_{th} = -\infty$ expressed in dB and that the above-mentioned median estimator is used, it can be shown that the variance $\sigma_{d,ij}^2$ of the distance $d_{ij}$ depends upon the shadowing coefficient $\sigma_z^1$ as follows:

$$\sigma_{d,ij}^2 = d_{ij}^2 e^{S_{ij}^2} (e^{S_{ij}^2} - 1) \quad (8)$$

with $$S_{ij} = \frac{\sigma_{z,ij} \ln 10}{10 \alpha_{ij}}$$

where $\sigma_{z,ij}$ is the shadowing coefficient of the channel between nodes i and j.

Under the same assumption as above, in typical operating conditions, the bias of the median estimator is negligible and the actual distance $d_{ij}$ in (8) can be replaced by its estimate $\tilde{d}_{ij}$ to get an approximate value $\hat{\sigma}_{d,ij}^2$ of $\sigma_{d,ij}^2$.

The conventional WLS positioning algorithm suffers from several severe limitations.

First, this algorithm assumes that the path loss decay exponents $\alpha_{ij}$ and the variance terms $\sigma_{d,ij}^2$ are available a priori. However, this condition is rarely met in practice as the environment and the channel configuration are often unknown or may change as a function of time. Furthermore, the nodes can be mobile and, in such instance, the terms $\alpha_{ij}$ and $\sigma_{d,ij}^2$ may vary due to a change of environment and/or channel configuration.

Second, the receivers have in practice a limited sensitivity (i.e. a finite detection threshold if $P_{th}$ is labeled in dBm). The probability density function of the received signal strength $P_{Rx}$ expression (3) is not a Gaussian distribution anymore but is truncated below the detection threshold $P_{th}$. This truncation leads in turn to a so-called "distortion" of the probability density function of the estimation errors $\tilde{d}_{ij} - d_{ij}$ in comparison with the standard Gaussian centered case.

FIG. 2A represents the probability density functions of the received signal strength (RSS), $P_{Rx}$, respectively measured by an ideal receiver and a non-ideal receiver having a detection threshold $P_{th}$.

It will be noted that the probability density function of the received signal strength for the ideal receiver is represented by a Gaussian curve (210) whereas the one for the non-ideal receiver (220) has a similar shape but truncated below $P_{th}$. Strictly speaking, curve (220) represents a conditional probability density function (probability of the received signal strength conditioned on true detection of the signal). For the sake of understanding and for facilitating the comparison with the ideal case, the conditional probability density has not been normalized.

FIG. 2B represents the probability density functions of the estimation ranging error $\tilde{d} - d$ (the indices referring to the nodes are omitted for the sake of simplification) for an ideal receiver (230) and a non-ideal receiver (240). As above, the probability should be understood as conditioned by true detection of the signal. The normalization has also been omitted for the sake of comparison.

While the probability density function 230 is substantially Gaussian and centered, the probability density function 240 is not centered anymore. In the latter case, distance estimation is affected by a systematic bias $\mu_d = E(\tilde{d} - d) \neq 0$ where $E(\cdot)$ is the mathematical expectation. Similarly, variance $\sigma_d^2$ can no longer be obtained from expression (8) for the purpose of the WLS optimization (7).

The problem underlying the invention is therefore to propose a node positioning algorithm for a WSN network which does not require knowledge of the environment and the channel configurations and which is nevertheless accurate.

A subsidiary problem is to propose a node positioning algorithm that further allows for the use of real receivers with limited power sensitivity.

DISCLOSURE OF THE INVENTION

The present invention is defined in the appended independent claims. Various advantageous embodiments are given in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

We will consider in the following a wireless network, for example a WSN network comprising anchor nodes (the respective positions of which are known) and regular nodes (the respective positions of which have to be determined). For example, the WSN network may comply with the IEEE 802.15.4 standard.

Each regular node is equipped with a receiver having a limited sensitivity. Without prejudice of generalization, we will assume in the following that all the receivers have the same RSS detection threshold $P_{th}$.

The idea at the basis of the invention is to propose a node positioning algorithm which is supervised by a channel configuration classifier. By channel configuration we mean here inter alia line-of-sight (LOS) or non line-of-sight (NLOS). A further channel configuration denoted $NLOS^2$ can also be envisaged, it refers to a NLOS situation where the propagation channel exhibits severe attenuation (deep fade) due to an obstruction.

Figure 1:
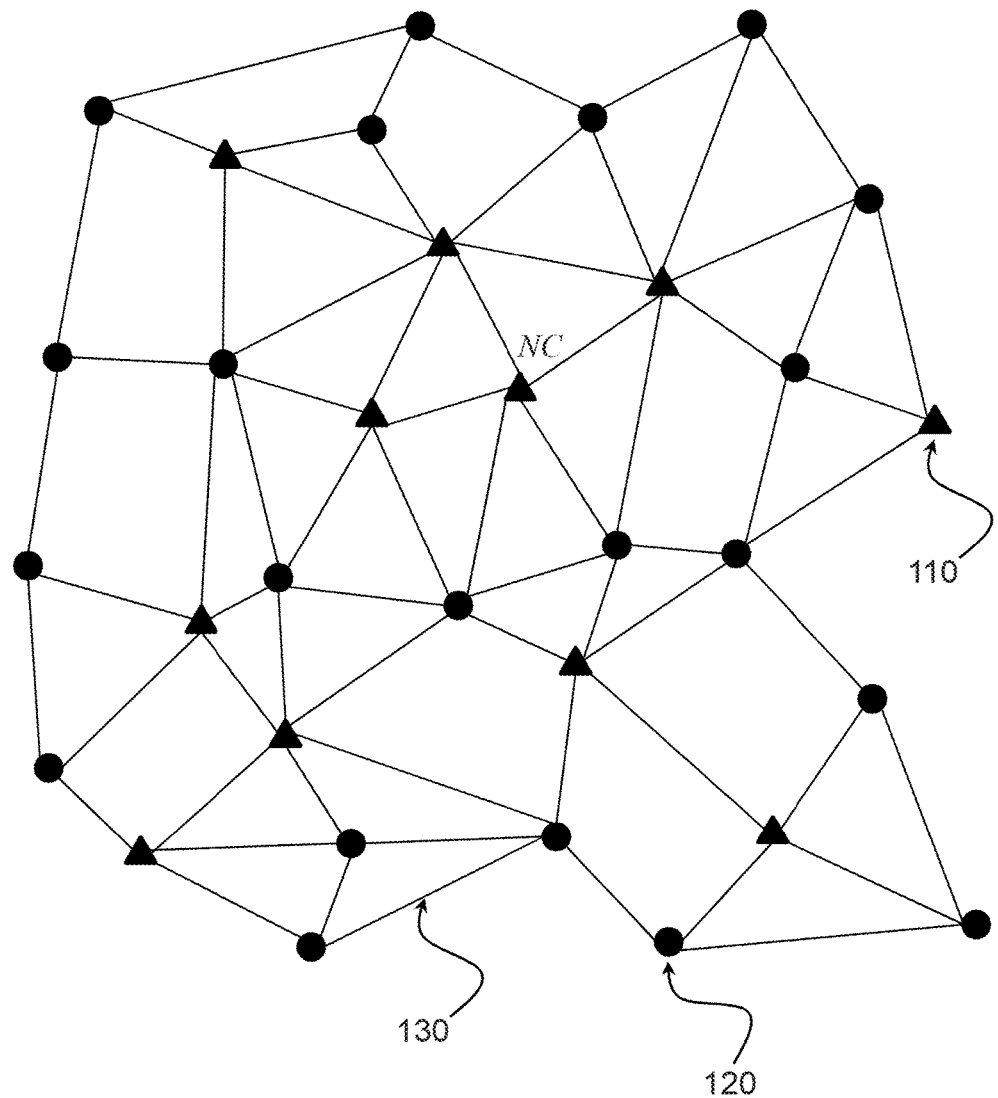
FIG. 1 schematically illustrates a wireless sensor network having anchor nodes and regular nodes.
Figure 2A:
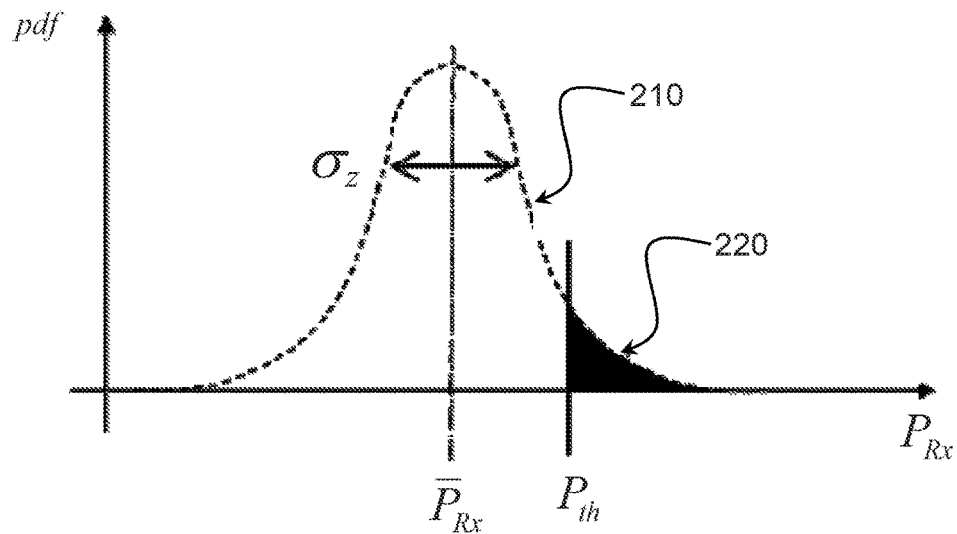
FIG. 2A schematically represents the probability distributions of the received signal strength for an ideal and a non-ideal receiver.
Figure 2B:
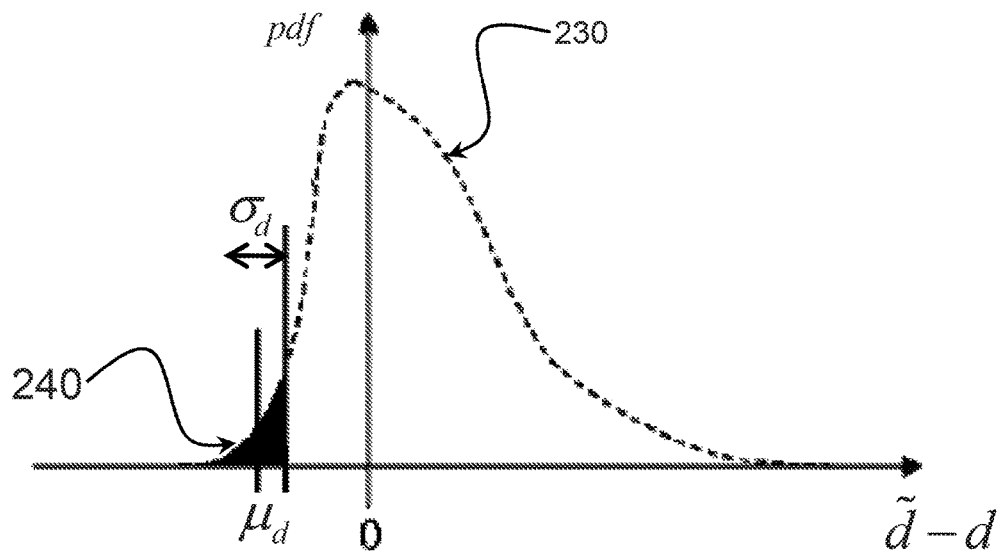
FIG. 2B schematically represents the probability distributions of the distance estimate error for an ideal and a non-ideal receiver.
Figure 3:
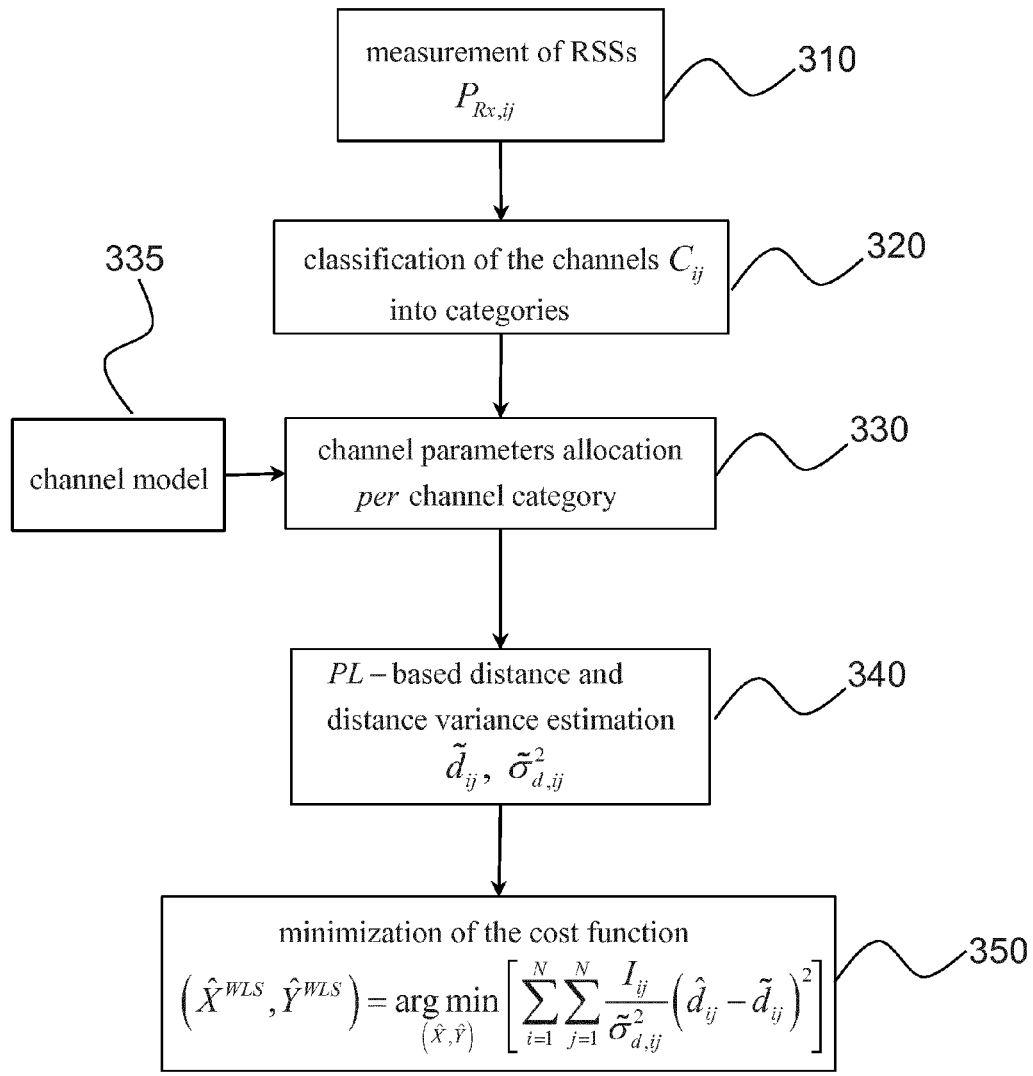
FIG. 3 schematically illustrates a method of node positioning for a wireless network according to a first embodiment of the invention.

FIG. 3 diagrammatically represents a node positioning algorithm according to a first embodiment of the invention.

The node positioning algorithm is performed after the network discovery has been completed. Preferably, the nodes are grouped into clusters and the node positioning algorithm is carried out individually on each cluster. Without loss of generality, we will assume in the following that the network contains only one cluster.

At step 310, each regular node i of the network measures the respective received signal strengths (RSSs) of the signals it respectively receives from its neighbors j.

At step 320, the propagation channels linking neighboring nodes are classified into different channel categories. For example, the channels can be classified into line of sight (LOS) and non line of sight (NLOS) categories as explained further below. Preferably, the channels are classified into three categories: LOS, NLOS and $NLOS^2$ as defined above. Additional categories may be envisaged without departing from the scope of the present invention.

At step 330, each channel $C_{ij}$ between neighboring nodes i and j is allocated a path loss decay exponent $\alpha_{ij}$, a path loss reference $PL_{0,ij}$ and a shadowing coefficient $\sigma_{z,ij}^2$, according to the category the channel belongs to. It will be understood that the path loss law according to (3) is then completely defined, provided the reference distance $d_0$ is known. In some instances, the reference distance $d_0$ may depend upon the category of the channel, the reference distances are then denoted $d_{0,LOS}$, $d_{0,NLOS}$, and $d_{0,NLOS^2}$.

If channel $C_{ij}$ has been classified as LOS, $\alpha_{ij}=\alpha_{LOS}$, $PL_{0,ij}=PL_{0,LOS}$ and $\sigma_{z,ij}^2=\sigma_{LOS}^2$. Conversely, if channel $C_{ij}$ has been classified as NLOS, $\alpha_{ij}=\alpha_{NLOS}$, $PL_{0,ij}=PL_{0,NLOS}$ and $\sigma_{z,ij}^2=\sigma_{NLOS}^2$. The same applies mutatis mutandis to $NLOS^2$. The parameters $\alpha_{LOS}$, $\alpha_{NLOS}$, $\alpha_{NLOS^2}$, $PL_{0,LOS}$, $PL_{0,NLOS}$, $PL_{0,NLOS^2}$, $\sigma_{LOS}^2$, $\sigma_{NLOS}^2$, $\sigma_{NLOS^2}^2$ are determined a priori by a channel model in 335. This model can depend upon the type of environment (e.g. urban, rural) in which the network is located.

At step 340, distance estimates $\tilde{d}_{ij}$ are calculated from the received signal strengths measured at step 310 and the path loss decay exponents obtained at step 330.

More specifically, the estimate $\tilde{d}_{ij}$ of the distance between nodes i and j is given by expression (5), that is:

$$\tilde{d}_{ij} = \exp(M_{ij}) \text{ where}$$

$$M_{ij} = \frac{([P_{Tx} + G_{Rx} + G_{Tx} - P_{Rx,ij}] - PL_{0,ij})\log(10)}{10\alpha_{ij}} + \log(d_{0,ij}) \quad (9)$$

with $P_{Rx,ij}$ is the RSS of the signal received by node i from node j, $PL_{0,ij}$ is the path loss data at reference distance $d_{0,ij}$ (indexation by ij accounts here for the case where different reference distances are chosen for different channel categories e.g. $d_{0,ij}=d_{0,LOS}$, or $d_{0,ij}=d_{0,NLOS^2}$), $\alpha_{ij}=\alpha_{LOS}$, $\alpha_{ij}=\alpha_{NLOS}$ or $\alpha_{ij}=\alpha_{NLOS^2}$ depending on the category of the channel.

For each channel, the variance of the distance estimator is obtained by the approximation:

$$\tilde{\sigma}_{d,ij}^2 = [\tilde{d}_{ij}^2 \exp(S_{ij}^2)(e^{S_{ij}^2}-1)] \quad (10)$$

where $$S_{ij} = \frac{\sigma_{z,ij}\ln 10}{10\alpha_{ij}}.$$

At step 350, the positions of the regular nodes are estimated by minimizing the weighted quadratic cost function:

$$(\hat{X}^{WLS}, \hat{Y}^{WLS}) = \underset{(\hat{x},\hat{y})}{\mathrm{argmin}} \left[ \sum_{i=1}^{N} \sum_{j=1}^{N} \frac{I_{ij}}{\tilde{\sigma}_{d,ij}^2} (\hat{d}_{ij} - \tilde{d}_{ij})^2 \right] \quad (11)$$

where $\hat{X}=[\hat{x}_{N_\alpha+1} \ldots \hat{x}_i \ldots \hat{x}_N]$, $\hat{Y}=[\hat{y}_{N_\alpha+1} \ldots \hat{y}_i \ldots \hat{y}_N]$ and $\hat{d}_{ij} = \sqrt{(\hat{x}_i-\hat{x}_j)^2 + (\hat{y}_i-\hat{y}_j)^2}$.

It should be understood that only the terms $(\hat{d}_{ij}-\tilde{d}_{ij})^2$ for which $I_{ij}=1$ need to be calculated in (11), that is only the terms for which at least node i or node j is a regular node and $P_{Rx,ij}>P_{th}$. Where one of these nodes is an anchor node, its coordinates $\hat{x}_i$, $\hat{y}_i$ are those which are known.

The WLS solution $(\hat{X}^{WLS}, \hat{Y}^{WLS})$ gives estimates of the abscissas $[\hat{x}_{N_\alpha+1}^{WLS}, \ldots, \hat{x}_N^{WLS}]$ and ordinates $[\hat{y}_{N_\alpha+1}^{WLS}, \ldots, \hat{y}_N^{WLS}]$ of the regular nodes.

Minimization of quadratic cost function (11) can be achieved in various ways e.g. by using the algorithm of steepest descent. This algorithm can be initialized by an initial guess of the coordinates of the regular nodes. Advantageously, a range-free node positioning method such as the DV-hop referred to above may provide this initial guess.

The node positioning algorithm described above can be carried out, at least partially, in a centralized way, at the network coordinator. In such instance, the RSS measurements $P_{Rx,ij}$ or, preferably, the distance estimates $\tilde{d}_{ij}$ are forwarded to the network controller in charge of the WLS optimization. According to a variant, the network coordinator can collect the RSS measurements or the distance estimates and forward them to a calculation node.

Channel classification in 320 can be obtained in various ways.

For example, the channel classification can be based on the statistical properties of the power envelope of the received signal.

For a LOS path, the power envelope exhibits a Ricean distribution whereas for a NLOS path, the power envelope exhibits a Rayleigh distribution. The fit to one distribution or the other can be determined e.g. by using a Kolgomorov-Smirnov test.

Alternately, LOS/NLOS discrimination can be based on the crossing rate of the power envelope (i.e. the rate at which the power envelope crosses a predetermined level) and/or the average fade duration (i.e. how long the power envelope remains below a predetermined level).

A detailed description of the above-mentioned channel classification methods can be found in the article of S. Al-Jazzar et al. entitled "New algorithms for NLOS identification", published in IST Mobile and Wireless Comm. Summit, Dresden, 2005, incorporated herein by reference.

According to another variant, the channel classification can be based on the statistics of the strength of the received signal (RSS). A detailed description of the two channel classification methods can be found in the article of K. Yu et al. entitled "Statistical NLOS identification based on AOA, TOA and signal strength" published in IEEE Trans. on Vehicular Technology, vol. 58, No. 1, January 2009, pp. 274-286, incorporated herein by reference.

Figure 4:
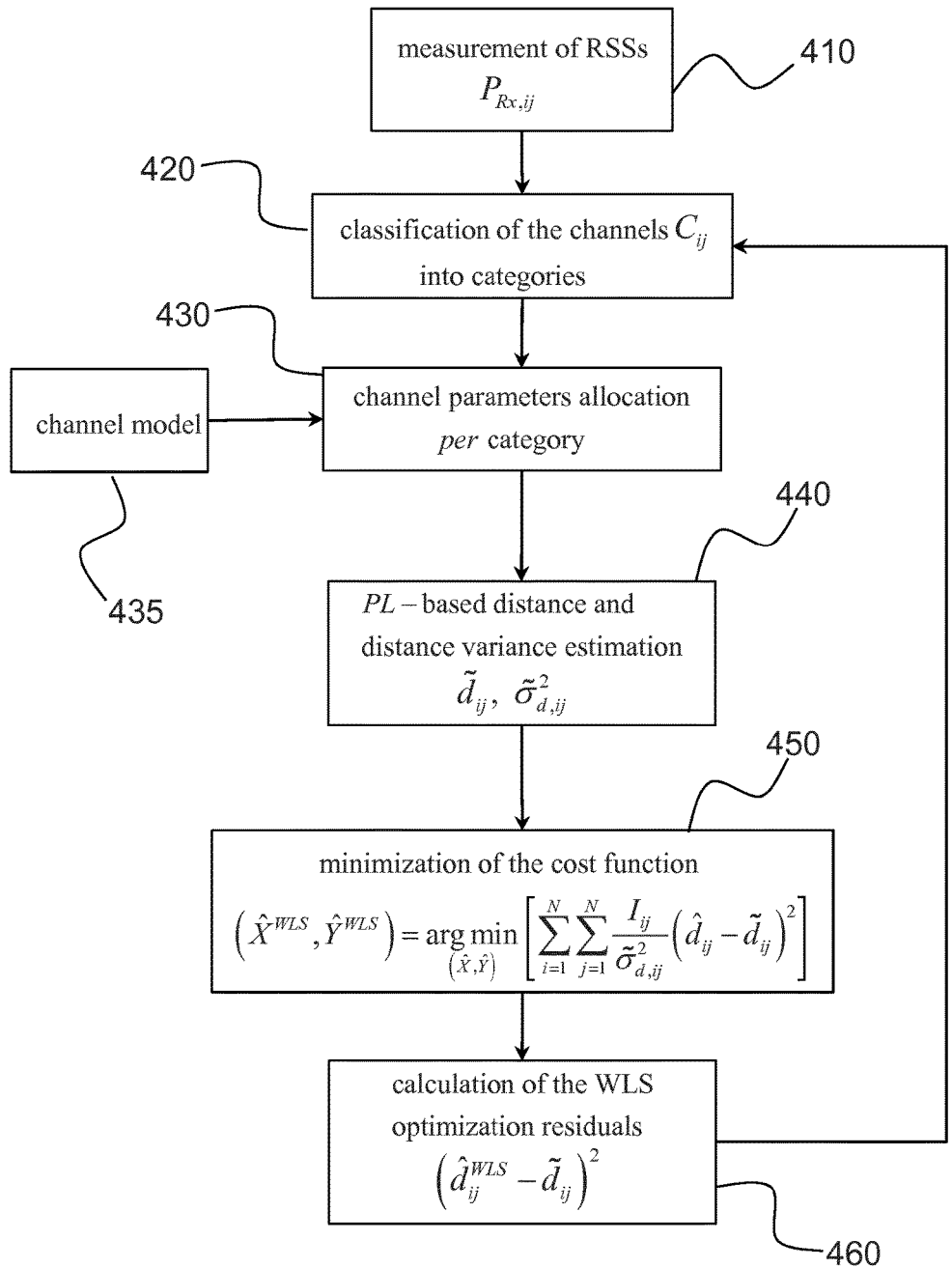
FIG. 4 schematically illustrates a method of node positioning for a wireless network, according to a variant of this embodiment.

According to a preferred variant illustrated in FIG. 4, the channel classification is obtained by exploiting the WLS optimization residuals.

In FIG. 4, steps 410, 430 to 450 are identical to steps 310, 330 to 350 of FIG. 3 and their description will therefore not be repeated here.

However, by contrast with the first variant, channel classifier 420 systematically classifies the channels into the LOS category in a first attempt. In other words all $C_{ij}$ are initially assumed to be LOS in a first run.

Once the positions of the regular nodes have been estimated in 450, the WLS optimization residuals, $|\hat{d}_{ij}^{WLS}-\tilde{d}_{ij}|$ (or $(\hat{d}_{ij}^{WLS}-\tilde{d}_{ij})^2$) are calculated in step 460, where:

$$\hat{d}_{ij}^{WLS}=\sqrt{(\hat{x}_i^{WLS}-\hat{x}_j^{WLS})^2+(\hat{y}_i^{WLS}-\hat{y}_j^{WLS})^2} \quad (12)$$

is a refined estimate of the distance separating nodes i and j based on WLS optimization of the positions of the nodes. Again, if i or j is an anchor node its actual coordinates are used instead of estimates in (12) for the calculation of the WLS optimization residual.

It should be understood that only the optimization residuals contributing to the cost function are actually calculated (those for which adjacency matrix element $I_{ij}\neq 0$, i.e. those involving at least one regular node with $P_{Rx,ij}>P_{th}$).

These optimization residuals are provided to the channel classifier at step 420 which, in a second run, classifies the channels as follows:

If $|\hat{d}_{ij}^{WLS}-\tilde{d}_{ij}|\leq\delta$, where $\delta$ is a predetermined error margin, the first guess (LOS category) is confirmed, $C_{ij}$ is classified as LOS.

Else, the first guess is infirmed and $C_{ij}$ is classified as NLOS.

In practice, a value of $\delta=0.25$ m has been found acceptable for IEEE 802.15.4-compliant networks in a typical 50 m*50 m scene.

Preferably, channels classified as NLOS are ranked according to their optimization residuals and a predetermined part of these channels are promoted to category NLOS². More specifically, a predetermined percentage of the NLOS channels exhibiting the highest optimization residuals are considered as NLOS². Alternately, the channels for which the first guess was erroneous beyond a second error margin, i.e. $|\hat{d}_{ij}^{WLS}-\tilde{d}_{ij}|>\Delta$, where $\Delta>\delta$, are considered as NLOS². In practice a value of $\Delta=0.5$ m has been found acceptable in the scenario mentioned above.

At any rate, steps 430, 440 and 450 are carried out once again with the updated channel classification. Step 450 outputs refined estimates of the positions of the regular nodes, denoted $\hat{X}_{(2)}^{WLS}$ and $\hat{Y}_{(2)}^{WLS}$.

It will be understood that the cooperative process of channel classification, path-loss based distance estimation and WLS optimization can be iterated. More precisely, channel classification will benefit from a more accurate positioning and the WLS optimization will conversely benefit from a more accurate channel classification. The process is iterated until a stopping criterion is met. The stopping criterion can be based for example on a distance between consecutive position estimates such as:

$$\|\hat{X}_{(n)}^{WLS}-\hat{X}_{(n-1)}^{WLS}\|+\|\hat{Y}_{(n)}^{WLS}-\hat{Y}_{(n-1)}^{WLS}\|<\epsilon \quad (13)$$

where $\epsilon$ is a predetermined positive number and n the latest iteration step. Alternately or subsidiarily, the iteration process can be stopped when a predetermined number of iterations is reached.

As already indicated above, the channel classifier of the preferred variant initially assumes that all channels are LOS. Alternately however, if a channel classification is available, e.g. as provided by one of the classification methods set out above (based on the statistics of the power envelope or RSSI measurements) the channel classifier may start from this available classification. If the initial guess proves to be erroneous for a given channel (e.g. optimization residual greater than $\delta$ when the channel was classified as LOS), the channel may then be tentatively classified in another category.

Again, the node positioning algorithm described above can be carried out, at least partially, in a centralized way, at the network coordinator. In such instance, the RSS measurements $P_{Rx,ij}$ or, preferably, the distance estimates $\tilde{d}_{ij}$ are forwarded to the network controller in charge of the WLS optimization. According to a variant, the network coordinator can collect the RSS measurements or the distance estimates and forward them to a calculation node.

Figure 5:
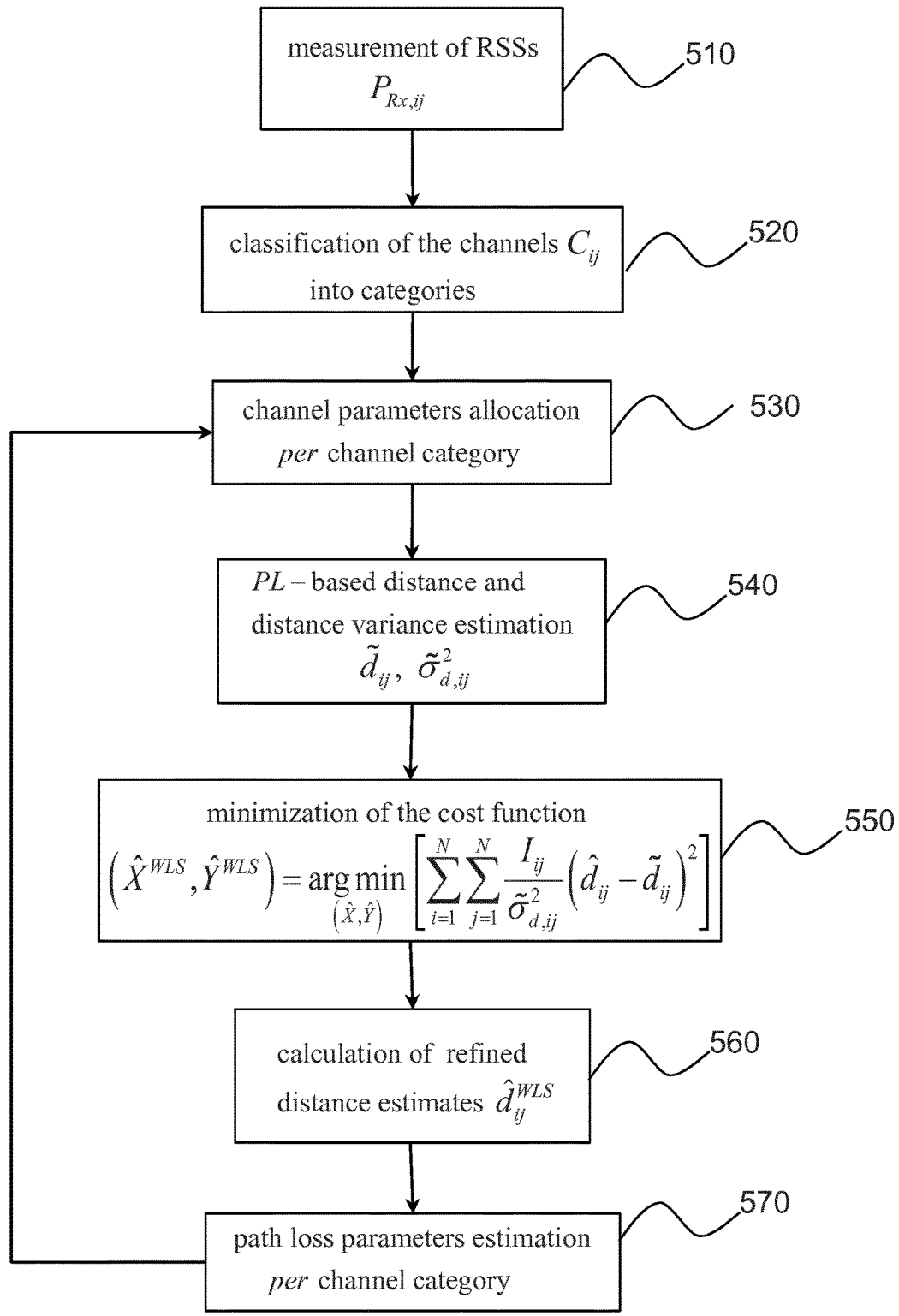
FIG. 5 schematically illustrates a method of node positioning for a wireless network, according to a second embodiment of the invention.

FIG. 5 illustrates a node positioning algorithm according to a second embodiment of the invention.

It is assumed in this embodiment that the channels are classified according to the statistics of their CIRs as in the first variant described above, or that the channel classification is provided by a distinct and independent classifier.

Contrary to the first embodiment in which path loss parameters $\alpha_{LOS}$, $\alpha_{NLOS}$, $\alpha_{NLOS^2}$, $PL_{0,LOS}$, $PL_{0,NLOS^2}$, $\sigma_{LOS}^2$, $\sigma_{NLOS}^2$, $\sigma_{NLOS^2}^2$ were assumed to be known a priori from the channel model, the present embodiment performs a blind estimation of at least some of these parameters, as explained hereinafter.

Steps 510, 520, 540, 550 are identical to steps 310, 320, 340, 340, and therefore their description will be omitted.

At step 530, the path loss parameters of LOS, NLOS and NLOS² are initialized at predetermined values.

The distances estimates, $\tilde{d}_{ij}$, are then first calculated in step 540 on basis of these initial values.

After the positions of the regular nodes have been estimated in 550, refined estimates of the distances between the regular nodes, $\hat{d}_{ij}^{WLS}$, are calculated in step 560 according to expression (12).

The path loss parameters are then estimated in 570 on the basis of the refined distance estimates. More specifically, the channels are clustered into groups of LOS, NLOS and NLOS² channels and, for each group, a set of equations according to (3) is solved. For example, for the group of LOS channels, $\alpha_{LOS}$, $PL_{0,LOS}$ can be estimated by solving:

$$PL_{ij} = \widehat{PL}_{0,LOS} = 10\hat{\alpha}_{LOS} \log_{10}(\hat{d}_{ij}^{WLS}/d_{0,LOS}) \quad (14)$$

where path loss $PL_{ij}$ is determined from $P_{Rx,ij}$ according to expression (3), $\widehat{PL}_{0,LOS}$ and $\hat{\alpha}_{LOS}$ are respectively the path loss reference and the exponent decay coefficient estimates of a LOS channel. It has been assumed in (14) that the reference distance $d_{0,LOS}$ was known. In practice, it may also be estimated together with $\alpha_{LOS}$, $PL_{0,LOS}$ by solving the set of equations (14) for the LOS channels.

The set of equations (14) (or similar sets of equations for NLOS and NLOS²) are generally over-determined and hence can be solved via LS optimization. If needed, an estimation of the shadowing coefficient $\sigma_{LOS}^2$, denoted $\hat{\sigma}_{LOS}^2$, can be obtained from the estimation errors on $PL_{LOS}$ fitting. The same applies also to NLOS and NLOS².

The path loss parameters estimated in 570 can be used for a second distance estimation in 540 and node positioning in 550. In fact, the cooperative process of node positioning and path loss parameters estimation can be iterated: a more accurate positioning leads to more accurate parameters, and vice versa.

The process is iterated until a predetermined stopping criterion is met. In addition to stopping condition (12) a further condition on consecutive estimates of the path loss parameters can be envisaged such as:

$$|\widehat{plp}^{(n)} - \widehat{plp}^{(n-1)}| < \eta \quad (15)$$

where $\widehat{plp}^{(n)}$ represents an estimate of any of the PL parameters above obtained at the $n^{th}$ iteration and $\eta$ is a predetermined positive number.

Figure 6:
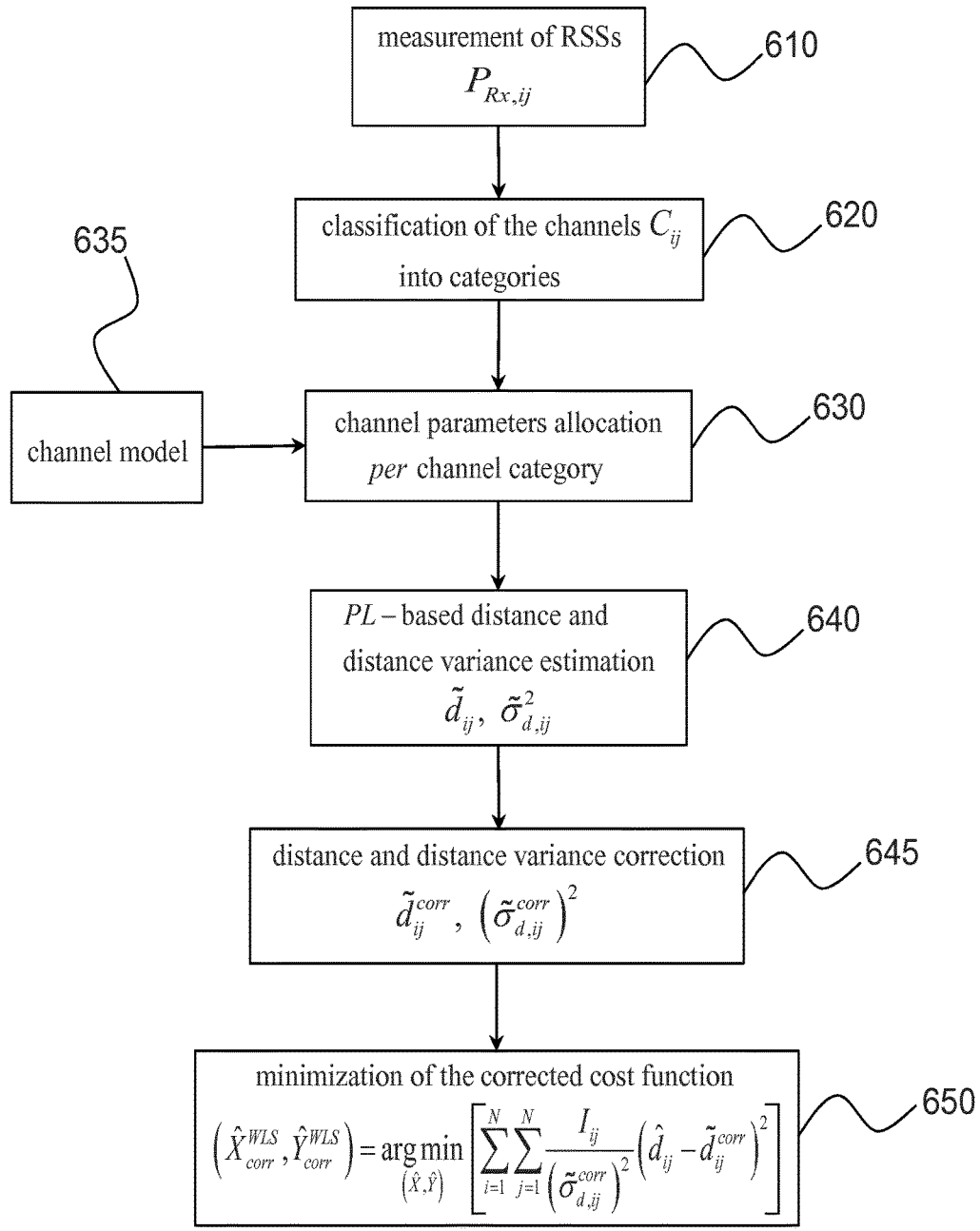
FIG. 6 schematically illustrates a method of node positioning for a wireless network, according to a third embodiment of the invention.

FIG. 6 illustrates a node positioning algorithm according to a third embodiment of the invention.

The third embodiment differs from the first in that the effects of sensitivity limitation of the receivers are now taken into account.

More specifically, steps 610 to 640 are identical to steps 310 to 340, respectively.

At step 645, however, the systematic biases on the distance estimates and the change of the distance variance terms, induced by the sensitivity limitation, are corrected.

Assuming the median estimator is used, it is recalled (see expression (5)) that, for a perfect receiver with infinite sensitivity (i.e. infinite detection threshold in dBm), the distance d can be estimated from received signal strength $P_{Rx}$:

$\tilde{d} = \exp(M)$ where $$M = \frac{([P_{Tx} + G_{Rx} + G_{Tx} - P_{Rx}] - PL_0)\log(10)}{10\alpha} + \log(d_0)$$

For a real receiver having finite detection threshold $P_{th}$, only the detected received power below this threshold can be taken into account into the further ranging and positioning calculi. Hence, the shape of the (conditional i.e. conditioned on a detection) probability density function of the RSS can be considered as truncated in comparison with the one of an ideal receiver with an infinite threshold ($P_{th} = -\infty$ in dBm). The median distance estimator is consequently affected by a bias $\mu_d = E_z(\tilde{d} - d)$ where the expectation is taken over the distribution of random variable z (see expression (4)). This bias can be calculated from threshold value $P_{th}$ as follows:

$$\mu_d = d\left[\frac{1}{2\sqrt{2A}\, \sigma_z Pr_{det}} \exp\left(\frac{B^2 - 4AC}{4A}\right) \text{erfc}\left(\frac{B}{2\sqrt{A}}\right) - 1\right] \quad (16)$$

With $$A = \frac{1}{2\sigma_z^2}, \quad B = \frac{\ln(10)}{10\alpha} + \frac{P_{th} - \overline{P}_{Rx}}{\sigma_z^2}, \text{ and}$$

$$C = (P_{th} - \overline{P}_{Rx})\left(\frac{\ln(10)}{10\alpha} + \frac{P_{th} - \overline{P}_{Rx}}{\sigma_z^2}\right),$$

and $Pr_{det}$ is the detection rate of the received signal:

$$Pr_{det} = \int_{P_{th}}^{+\infty} pdf(P_{Rx})dP_{Rx} = \frac{1}{2}\text{erfc}\left(\frac{P_{th} - \overline{P}_{Rx}}{\sqrt{2}\sigma_z}\right) \quad (17)$$

where $\overline{P}_{Rx}$ the mean received signal strength and erfc(•) is the Gauss error function.

Similarly, due to the sensitivity limitation, the variance of the distance estimator cannot be obtained from expression (8) anymore. Starting from the definition $\sigma_d^2 = E_z[(\tilde{d}-d)^2] - \mu_d^2$ where the expectation is taken over the distribution of random variable z, it can be shown that this variance can be expressed as:

$$\sigma_d^2 = \quad (18)$$

$$d^2\left[\frac{1}{2\sqrt{2A'}\, \sigma_z Pr_{det}} \exp\left(\frac{B'^2 - 4A'C'}{4A'}\right) \text{erfc}\left(\frac{B'}{2\sqrt{A'}}\right) - 2\left(\frac{\mu_d}{d}\right) - 1\right] - \mu_d^2$$

with A'=A, $$B' = \frac{\ln(10)}{5\alpha} + \frac{P_{th} - \overline{P}_{Rx}}{\sigma_z^2}, \quad C' = (P_{th} - \overline{P}_{Rx})\left(\frac{\ln(10)}{5\alpha} + \frac{P_{th} - \overline{P}_{Rx}}{2\sigma_z^2}\right)$$

It should be noted that expressions (16) and (17) are parametric functions of distance d. These parametric functions can be pre-computed for various values of d and the results stored in a look-up table.

Turning back to step 645, the distance estimates $\tilde{d}_{ij}$ obtained at step 640 are corrected as follows:

$$\tilde{d}_{ij}^{corr} = \tilde{d}_{ij} - \hat{\mu}_{d,ij} \quad (19)$$

where $\tilde{d}_{ij}^{corr}$ denotes the corrected estimate of the distance between nodes i and j and where $\hat{\mu}_{d,ij}$ is obtained from equation (16) by using the distance estimate $d=\tilde{d}_{ij}$.

Similarly, the corrected distance variance terms, $(\tilde{\sigma}_{d,ij}^{corr})^2$ can be calculated from expression (18) by using the distance estimate $d=\tilde{d}_{ij}$. According to a variant, the corrected distance $\tilde{d}_{ij}^{corr}$ can be used instead.

At step 650, the positions of the regular nodes are estimated by minimizing the corrected cost function:

$$(\hat{X}_{corr}^{WLS}, \hat{Y}_{corr}^{WLS}) = \underset{(\hat{X},\hat{Y})}{\operatorname{argmin}} \left[ \sum_{i=1}^{N} \sum_{j=1}^{N} \frac{I_{ij}}{(\tilde{\sigma}_{d,ij}^{corr})^2} (\hat{d}_{ij} - \tilde{d}_{ij}^{corr})^2 \right] \quad (20)$$

As for the previous embodiments, minimization of the corrected cost function (20) can be achieved in various ways e.g. iteratively by using the steepest descent algorithm.

According to a variant of the third embodiment (not described), the distance correction and distance variance correction (645) are not performed prior to the minimization of the cost function (650). Instead, if the minimization of the cost function is carried out iteratively, the distance correction and variance correction are updated at each iteration. More specifically, if $\hat{x}_i^{(m)}, \hat{y}_i^{(m)}$ denote the abscissas and the ordinates of the nodes at current iteration m, the corrected distance $\tilde{d}_{ij}^{corr}$ and the corrected variance $(\tilde{\sigma}_{d,ij}^{corr})^2$ at iteration m+1 are calculated from expressions (16) and (18), by using the refined distance estimate $\hat{d}_{ij}^{(m)} = ((\hat{x}_i^{(m)} - \hat{x}_j^{(m)})^2 + (\hat{y}_i^{(m)} - \hat{y}_j^{(m)})^2)^{1/2}$ just obtained.

It will be understood by the man skilled in the art that the present embodiment can also be combined with the various channel classification methods described in relation with the first embodiment. For example, the channel classification in 620 can be performed on the basis of the optimization residuals of corrected cost function (20). The cooperative process of channel classification and node positioning can also be iterated in the same way as described in relation with FIG. 4, until a predetermined stopping criterion is met.

Furthermore, the present embodiment can also be combined with the channel parameters blind estimation described in the relation with FIG. 5. More precisely, refined estimates of the distances between the regular nodes can be obtained by the positions obtained at step 650, similar to (12):

$$\hat{d}_{corr,ij}^{WLS} = \sqrt{(\hat{x}_{corr,i}^{WLS} - \hat{x}_{corr,j}^{WLS})^2 + (\hat{y}_{corr,i}^{WLS} - \hat{y}_{corr,j}^{WLS})^2} \quad (21)$$

where $\hat{x}_{corr,i}^{WLS}$ and $\hat{y}_{corr,i}^{WLS}$ are the elements of vectors $\hat{X}_{corr}^{WLS}$ and $\hat{Y}_{corr}^{WLS}$ respectively. These refined distance estimates can then be used to refine the channel model and update the channel parameters. As in the second embodiment, the cooperative process of blind channel parameters estimation and node positioning can be iterated until a predetermined stopping criterion is met.

The invention claimed is:

1. A node positioning method for a wireless network, the network including anchor nodes whose positions are known, and regular nodes whose positions have to be determined, the method comprising:
   (a) each regular node measuring respective strengths of signals received from neighboring nodes;
   (b) classifying channels linking any of the neighboring nodes into different channel categories;
   (c) allocating path loss parameters to each of the channels according to the category the channel is classified into;
   (d) estimating distances separating said each regular node from each of the neighboring nodes, and respective variances thereof, on the basis of measured strengths of the signals respectively received from the neighboring nodes and the allocated path loss parameters linking said each regular node with each of the neighboring nodes; and
   (e) estimating the positions of the regular nodes by minimizing a cost function depending upon weighted quadratic differences between distances separating said each regular node from the neighboring nodes and the estimated distances from (d), the weighted quadratic differences being inversely proportional to the respective variances of the estimated distances from (d),
   wherein said classifying further comprises first classifying all the channels into a line of sight category, and after the first completion of (c), (d), and (e), updating the first classification to the updated classification, in a second attempt, depending upon the estimated positions of the regular nodes step (e), and
   further comprising calculating, for each channel linking said each regular node and one of the neighboring nodes, an optimization residual indicative of a difference between the estimated distance at (d) and a refined estimated distance calculated from the estimated position of said each regular node at (e), and from the position of the neighboring node, which is a known position if the neighboring node is an anchor node, or is otherwise estimated at (e),
   wherein if the optimization residual relative to said each channel exceeds a predetermined first threshold, said each channel is classified into a non line of sight category, otherwise said each channel is maintained in the line of sight category,
   wherein if the optimization residual relative to said each channel exceeds a predetermined second threshold higher than the predetermined first threshold, said each channel is classified into a category of non line of sight with deep attenuation,
   wherein (b), (c), (d), and (e) are iterated, such that in each iteration after a first completion of (b), (c), (d), and (e):
      an allocation of path loss parameters in (c) taking into account an updated classification of the channels of (b) in said each iteration,
      the distances separating each regular node from each of its neighboring nodes and the variances thereof being estimated at (d) in said each iteration on the basis of the path loss parameters allocated at (c) in said each iteration, and
      the positions of the regular nodes being obtained in said each iteration by minimizing the cost function calculated with the distances and distance variances estimated at (d) in said each iteration.

2. The node positioning method according to claim 1, wherein said classifying further comprises classifying the channels into categories of line of sight, non line of sight, and non line of sight with deep attenuation.

3. The node positioning method according to claim 1, wherein the allocated path loss parameters are a path loss value at a reference distance, a path loss decay exponent, and a shadowing coefficient, the path loss value, the path loss decay exponent, and the shadowing coefficient being dependent upon a category into which the channel has been classified.

4. The node positioning method according to claim 1, wherein-said classifying further comprises classifying the channels on the basis of statistics of power envelopes of signals received from the channels.

5. The node positioning method according to claim 1, wherein said classifying further comprises classifying the channels on the basis of a crossing rate and/or average fade duration crossing rate of power envelopes of signals received from the channels.

6. The node positioning method according to claim 1, wherein a predetermined percentage of the channels classified into the non line of sight category, and exhibiting largest optimization residuals, are classified into a category of non line of sight with deep attenuation.

7. The node positioning method according to claim 1, wherein, in a first run, the path loss parameters are initialized in (c) at predetermined values for each channel category, and after (d) and (e) have been completed, further comprising:
(f) calculating refined distance estimates on basis of the positions of the regular nodes estimated at (e);
(g) using the refined distance estimates to estimate updated path loss parameters for each channel category; and
(h) allocating, in a second run of (c), the updated path loss parameters of the channels according to the categories the channels are respectively classified into.

8. The node positioning method according to claim 7, wherein (c), (d), (e), (f), and (g) are iterated, such that in each iteration after a first completion of (c), (d), (e), (f), and (g), the distances and the variances thereof being estimated for each channel category at (d) in said each iteration on the basis of the updated path loss parameters allocated in said each iteration, and the positions of the regular nodes being obtained in said each iteration by minimizing the cost function calculated with the distances and the variances thereof estimated at (d) in said each iteration.

9. The node positioning method according to claim 1, wherein the distances and variances thereof that have been estimated at (d) are corrected by performing (d' 1) and (d' 2) in which:
(d' 1) the distance estimate between any regular node of the regular nodes and each neighboring node thereof is corrected for a systematic bias depending upon a detection threshold of a receiver equipping the any regular node, a path loss decay exponent and a shadowing coefficient of the channel linking the any regular node and the neighboring node thereof;
(d' 2) the distance variance is corrected on the basis of the detection threshold of the receiver in the any regular node, the path loss decay exponent and the shadowing coefficient of the channel linking the any regular node and the neighboring node thereof; and
(e' 1) estimating the positions of the regular nodes by minimizing a cost function depending upon weighted quadratic differences between distances separating said each regular node from the neighboring nodes and corresponding estimated distances corrected at (d' 1), the weighted quadratic differences being inversely proportional to the respective estimated variances of the estimated distances corrected at (d' 2).

10. The node positioning method according to claim 1, wherein the cost function is minimized in iterations of (e), each iteration of (e) providing an estimate of the positions of the regular nodes and deducing therefrom a refined estimate of the distances separating said each regular node from the neighboring nodes,
the refined estimate being used for calculating:
a systematic bias depending upon a detection threshold of a receiver equipping the any regular node, a path loss decay exponent and a shadowing coefficient of the channel linking the any regular node and the neighboring node thereof, the distance estimate at (d) being corrected by the systematic bias;
a corrected distance variance depending upon the detection threshold, the path loss decay exponent, and the shadowing coefficient;
the positions of the regular nodes being estimated at a next iteration of (e) by continuing to minimize the cost function depending upon weighted quadratic differences between distances separating said each regular node from the neighboring nodes and corresponding estimated distances thus corrected, the weighted quadratic differences being inversely proportional to the respective estimated variances of the estimated distances thus corrected.

11. The node positioning method according to claim 1, wherein the cost function is minimized by a steepest descent algorithm, the node positions being first initialized by coarse node positions supplied by a range-free positioning algorithm.

* * * * *